United States Patent [19]

Tigwell

[11] Patent Number: 4,769,629
[45] Date of Patent: Sep. 6, 1988

[54] STOP LIGHT FOR A MOTORCYCLIST'S HELMET

[75] Inventor: David C. Tigwell, Spring, Tex.

[73] Assignee: John N. Stone, Jr., Houston, Tex.

[21] Appl. No.: 87,552

[22] Filed: Aug. 20, 1987

[51] Int. Cl.[4] ............................ B62J 3/00; B60Q 1/26
[52] U.S. Cl. ..................................... 340/134; 340/71; 340/72; 200/61.45 R
[58] Field of Search .................... 340/134, 72, 71, 56, 340/669, 689, 815.3; 200/61.45 R, 61.45 M, 52 A, 61.52; 362/72

[56] References Cited

U.S. PATENT DOCUMENTS

| | | | |
|---|---|---|---|
| 2,971,067 | 2/1961 | Ticknor | 340/72 |
| 3,089,129 | 5/1963 | Nassikas et al. | 340/72 |
| 3,760,353 | 9/1973 | Hassinger | 340/72 |
| 3,846,748 | 11/1974 | Hopwood | 340/71 |
| 4,559,516 | 12/1985 | Schott et al. | 340/134 |

*Primary Examiner*—Donnie L. Crosland
*Attorney, Agent, or Firm*—Fulbright & Jaworski

[57] ABSTRACT

An apparatus for actuating and deactuating a brake light affixed to a motorcyclist's helmet without any interface to the motorcycle. The apparatus illuminates and extinguishes the light by sensing the acceleration and deceleration forces.

4 Claims, 1 Drawing Sheet

4,769,629

STOP LIGHT FOR A MOTORCYCLIST'S HELMET

BACKGROUND OF THE INVENTION

In order to increase the safety of a motorcyclist it is desirable to provide an additional signal light on the motorcyclist's helmet which would act as a brake light when the motorcyclist is braking. While such a light could be electrically connected to the brake light of the motorcycle, such an arrangement would be disadvantageous as requiring wires hanging from the helmet, lack of interchangeability from motorcycle to motorcycle, application problems associated with non-standard motorcycle wiring, and the requirement for expensive weatherproof connectors.

The present stop light is affixed to the motorcyclist's helmet for good visibility but is actuated without any interface to the motorcycle.

SUMMARY

The present invention is directed to a stop light for a motorcyclist's helmet which is illuminated and extinguished by sensing the acceleration and deceleration forces acting on the helmet.

A still further object of the present invention is the provision of a motorcyclist's helmet with a light positioned on the helmet and an accelerometer for measuring deceleration positioned on the helmet and connected to the light. A voltage source is connected to the light for actuating the light upon measurement of deceleration by the accelerometer.

Still a further object of the present invention is wherein the accelerometer is a mercury switch positioned at an angle to horizontal.

Yet a still further object of the present invention is wherein the apparatus includes a first accelerometer for measuring deceleration for lighting the light and a second accelerometer for measuring acceleration for turning off the light. The first and second accelerometers may be first and second mercury switches positioned at an angle to the horizontal but in opposite directions.

Yet a still further object of the present invention is the provision of a stop light adapted to be positioned on a motorcyclist's helmet which includes electrical switch means controlling the actuation of the light. A multivibrator is connected to and controlling the switch with a first accelerometer for measuring deceleration connected to the multivibrator for actuating the light and a second accelerometer for measuring acceleration is connected to the multivibrator for turning off the light.

Other and further objects, features and advantages will be apparent from the following description of a presently preferred embodiment of the invention, given for the purpose of disclosure, and taken in conjuntion with the accompanying drawings.

DESCRIPTION OF THE PREFERRED EMBODIMENT

Figure 1:
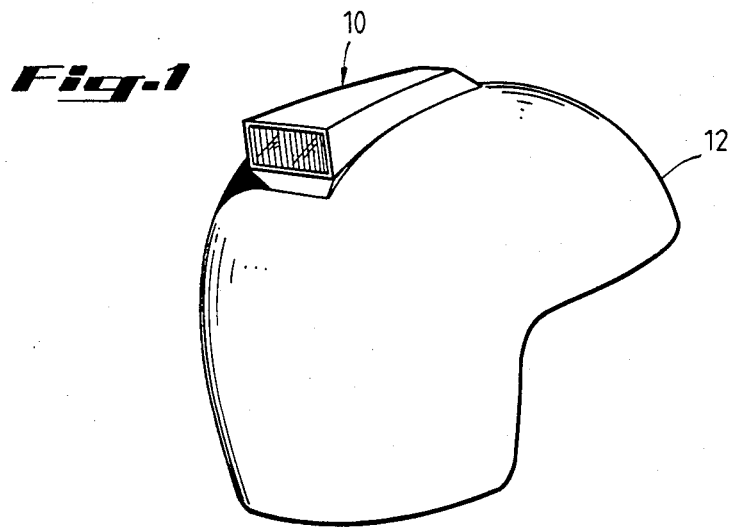
FIG. 1 is a perspective view of the light of the present invention affixed to a motorcyclist's helmet.

Referring now to the drawings, and particularly to FIG. 1, the present invention is generally indicated by the reference numeral 10 as a stop light connected to a conventional motorcyclist's helmet 12 and which is actuated and deactuated without any interface to the motorcycle.

The light 10 is illuminated and extinguished by sensing the acceleration and deceleration forces acting on the light 10. Therefore, the light 10 overcomes the disadvantages of other types of lights which require wiring connections to the motorcycle braking system.

Figure 2:
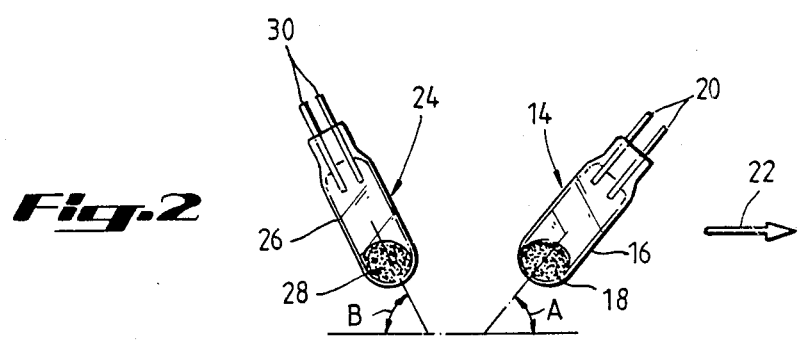
FIG. 2 is a schematic elevational view illustrating the principle of measuring deceleration and acceleration for actuating the light of FIG. 1.

While any suitable type of accelerometer may be used which measures deceleration for actuating a light, the preferred embodiment of the present invention utilizes, as best seen in FIG. 2, a first mercury tilt switch 14 having a glass envelope 16, a mercury drop 18 therein, and switch contacts 20. The first mercury switch 14 is at an angle A to the horizontal. A deceleration in the direction of the arrow 22 will cause the mercury drop 18 to rise upon the interior wall of the glass envelope 16 and make electrical contact between the two switch contacts 20 completing an electrical circuit between the contacts 20. Thus, assuming that the helmet 12 is moving in the direction 22 and suddenly decelerates the switch 14 provides an indication of that deceleration. The sensitivity of the mercury switch 14 is dependent upon the angle A.

The single mercury switch 14 will suitably sense deceleration and acceleration forces and can be used by itself for actuating and deactuating the light. In the preferred embodiment of the present invention a second mercury tilt switch generally indicated by the reference numeral 24 which has a glass envelope 26, a mercury drop 28 therein, and switch contacts 30, is provided for measuring acceleration for turning off the light. It is to be noted that the second mercury switch 24 is also tilted to the horizontal at an angle B which is in the opposite direction to the angle A of the first mercury switch 14.

Figure 3:
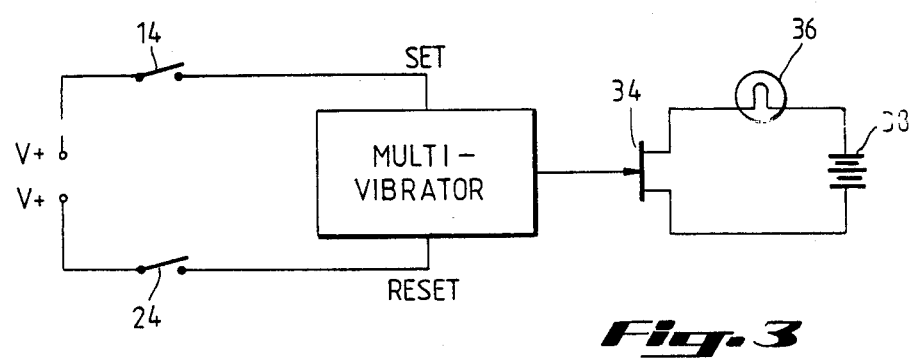
FIG. 3 is an electrical schematic illustrating one embodiment of the present invention.

Referring now to FIG. 3, a block diagram of the preferred embodiment is shown utilizing the first mercury switch 14 and the second mercury switch 24. The first switch 14 will close upon braking and the second switch 24 will close upon subsequent acceleration. Upon braking, switch 14 will close to provide a SET input of a one shot monostable multivibrator 32, such as NE 555. Actuation of the SET input will cause the multivibrator 32 to provide an output which goes high for a period of about ten seconds closing an electronic switch 34, such as a MOSFET or bipolar transistor, which will illuminate a lamp 36 in the light 10 through a voltage source 38. Acceleration at any time during the on period interval will cause the second switch 24 to close to actuate the reset input to the multivibrator 32 which will open the switch 34 and turn off the lamp 36.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. A stop light for a motorcyclist's helmet comprising,
   a motorcyclist's helmet,
   a light positioned on the helmet,
   a first accelerometer for measuring deceleration positioned on the helmet for lighting the light and a second accelerometer for measuring acceleration for turning off said light positioned on the helmet,
   a voltage source connected to the light for actuating the light upon measurement of deceleration by the accelerometer.

2. The apparatus of claim 1 wherein the first and second accelerometer are first and second mercury switches positioned at an angle to horizontal, but in opposite directions.

3. The apparatus of claim 1 wherein the first and second accelerometer are first and second mercury switches positioned at an angle to horizontal, but in opposite directions.

4. A stop light for a motorcyclist's helmet comprising,
   a light adapted to be positioned on a helmet,
   electrical switch means controlling the actuation of the light,
   a multivibrator connected to and controlling the switch,
   a first accelerometer for measuring deceleration and connected to the multivibrator for actuating the light,
   a second accelerometer for measuring acceleration and connected to the multivibrator for turning off the light.

* * * * *